(12) United States Patent
Miller et al.

(10) Patent No.: US 10,241,260 B2
(45) Date of Patent: Mar. 26, 2019

(54) EDGE SEALANT CONFINEMENT AND HALO REDUCTION FOR OPTICAL DEVICES

(71) Applicant: Molecular Imprints, Inc., Austin, TX (US)

(72) Inventors: Michael Nevin Miller, Austin, TX (US); Frank Y. Xu, Austin, TX (US); Vikramjit Singh, Pflugerville, TX (US); Eric C. Browy, Coral Springs, FL (US); Jason Schaefer, Coral Springs, FL (US); Robert D. TeKolste, Fort Lauderdale, FL (US); Victor Kai Liu, Mountain View, CA (US); Samarth Bhargava, Palo Alto, CA (US); Jeffrey Dean Schmulen, Austin, TX (US); Brian T. Schowengerdt, Seattle, WA (US)

(73) Assignee: Molecular Imprints, Inc., Austin, TX (US)

( * ) Notice: Subject to any disclaimer, the term of this patent is extended or adjusted under 35 U.S.C. 154(b) by 0 days.

(21) Appl. No.: 15/685,748

(22) Filed: Aug. 24, 2017

(65) Prior Publication Data

US 2018/0059320 A1 Mar. 1, 2018

Related U.S. Application Data

(60) Provisional application No. 62/380,066, filed on Aug. 26, 2016.

(51) Int. Cl.
*G02B 6/00* (2006.01)
*G02F 1/00* (2006.01)
(Continued)

(52) U.S. Cl.
CPC ..... *G02B 6/02142* (2013.01); *G02B 6/02309* (2013.01); *G02B 6/12016* (2013.01);
(Continued)

(58) Field of Classification Search
None
See application file for complete search history.

(56) References Cited

U.S. PATENT DOCUMENTS 4,360,015 A * 11/1982 Mayer ............... A61F 13/00029
602/47
4,723,953 A * 2/1988 Rosenbaum ...... A61F 13/53743
604/369

(Continued)

FOREIGN PATENT DOCUMENTS

WO WO2015128408 A1 9/2015

OTHER PUBLICATIONS

International Search Report and the Written Opinion for Application No. PCT/US2017/048442, dated Nov. 16, 2017, 14 pages.

*Primary Examiner* — Shawn Decenzo
*Assistant Examiner* — Jarreas C Underwood
(74) *Attorney, Agent, or Firm* — Fish & Richardson P.C.

(57) ABSTRACT

Techniques are described for using confinement structures and/or pattern gratings to reduce or prevent the wicking of sealant polymer (e.g., glue) into the optically active areas of a multi-layered optical assembly. A multi-layered optical structure may include multiple layers of substrate imprinted with waveguide grating patterns. The multiple layers may be secured using an edge adhesive, such as a resin, epoxy, glue, and so forth. A confinement structure such as an edge pattern may be imprinted along the edge of each layer to control and confine the capillary flow of the edge adhesive and prevent the edge adhesive from wicking into the functional waveguide grating patterns of the layers. Moreover, the edge
(Continued)

adhesive may be carbon doped or otherwise blackened to reduce the reflection of light off the edge back into the interior of the layer, thus improving the optical function of the assembly.

22 Claims, 11 Drawing Sheets

(51) Int. Cl.
    *G02B 6/02*           (2006.01)
    *G02B 6/12*           (2006.01)
    *G02B 6/35*           (2006.01)
    *G02F 1/35*           (2006.01)
    *G02B 27/01*         (2006.01)

(52) U.S. Cl.
    CPC ........... *G02B 6/3534* (2013.01); *G02B 27/01* (2013.01); *G02F 1/3515* (2013.01); *G02F 2201/307* (2013.01)

(56) References Cited

U.S. PATENT DOCUMENTS

| | | | | |
|---|---|---|---|---|
| 5,029,985 A | * | 7/1991 | Suzuki | G02F 1/1347 349/155 |
| 5,210,630 A | * | 5/1993 | Heynderickx | C09K 19/38 252/299.01 |
| 5,547,747 A | * | 8/1996 | Trokhan | A61F 13/53713 428/320.2 |
| 6,456,355 B1 | * | 9/2002 | Choi | G02F 1/1341 349/153 |
| 6,547,940 B2 | * | 4/2003 | Aksay | C01B 33/12 204/450 |
| 7,081,940 B2 | * | 7/2006 | Suzuki | G02F 1/1339 349/153 |
| 7,713,436 B1 | * | 5/2010 | Trajkovska-Petkoska | C09K 19/38 252/299.01 |
| 8,357,312 B2 | * | 1/2013 | Sun | C09K 19/52 252/299.01 |
| 2005/0155704 A1 | | 7/2005 | Yokajty et al. | |
| 2007/0082288 A1 | * | 4/2007 | Wright | B41M 5/46 430/200 |
| 2009/0256977 A1 | | 10/2009 | Haddock et al. | |
| 2011/0207328 A1 | | 8/2011 | Speakman | |
| 2012/0013969 A1 | * | 1/2012 | Wang | B32B 17/10036 359/296 |
| 2012/0224276 A1 | * | 9/2012 | Lin | G02B 5/223 359/891 |
| 2015/0023643 A1 | | 1/2015 | Chartoff et al. | |
| 2015/0158240 A1 | | 6/2015 | Haase et al. | |
| 2016/0116739 A1 | | 4/2016 | TeKolste et al. | |

\* cited by examiner

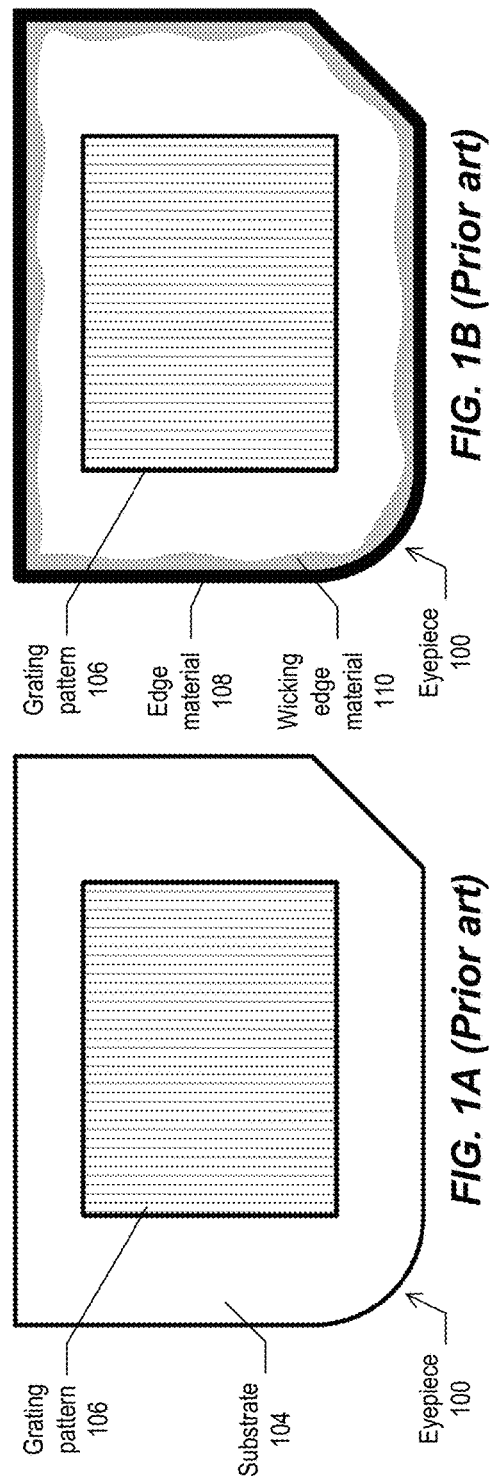
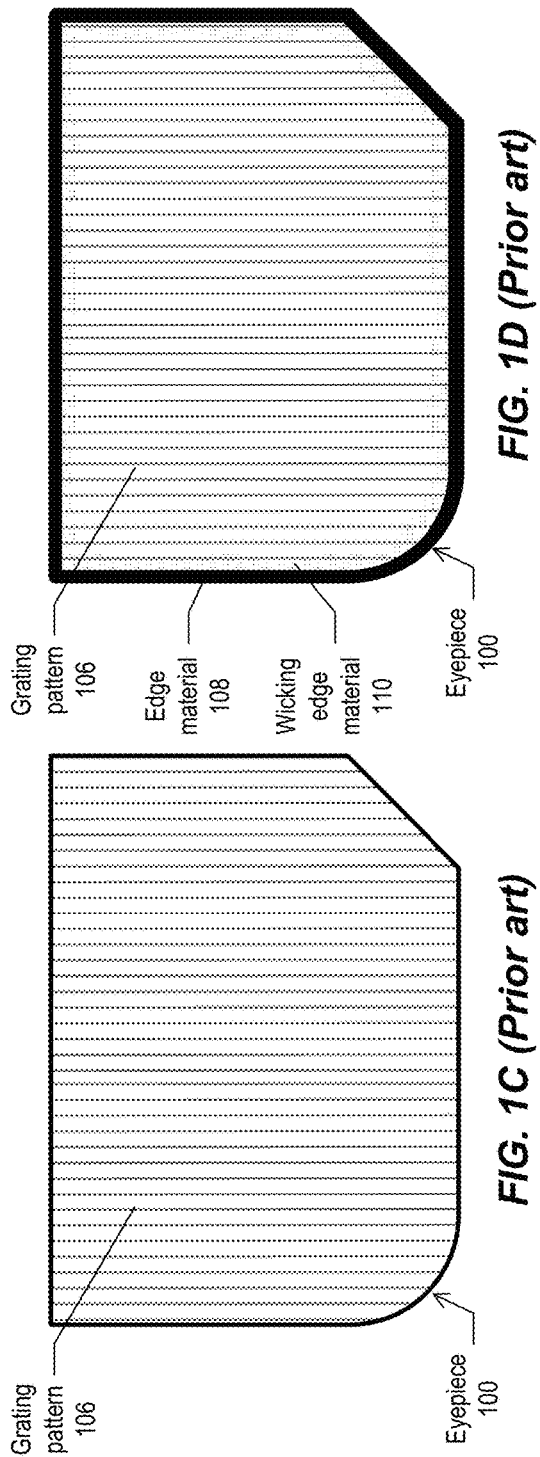
FIG. 1A (Prior art)
FIG. 1B (Prior art)
FIG. 1C (Prior art)
FIG. 1D (Prior art)

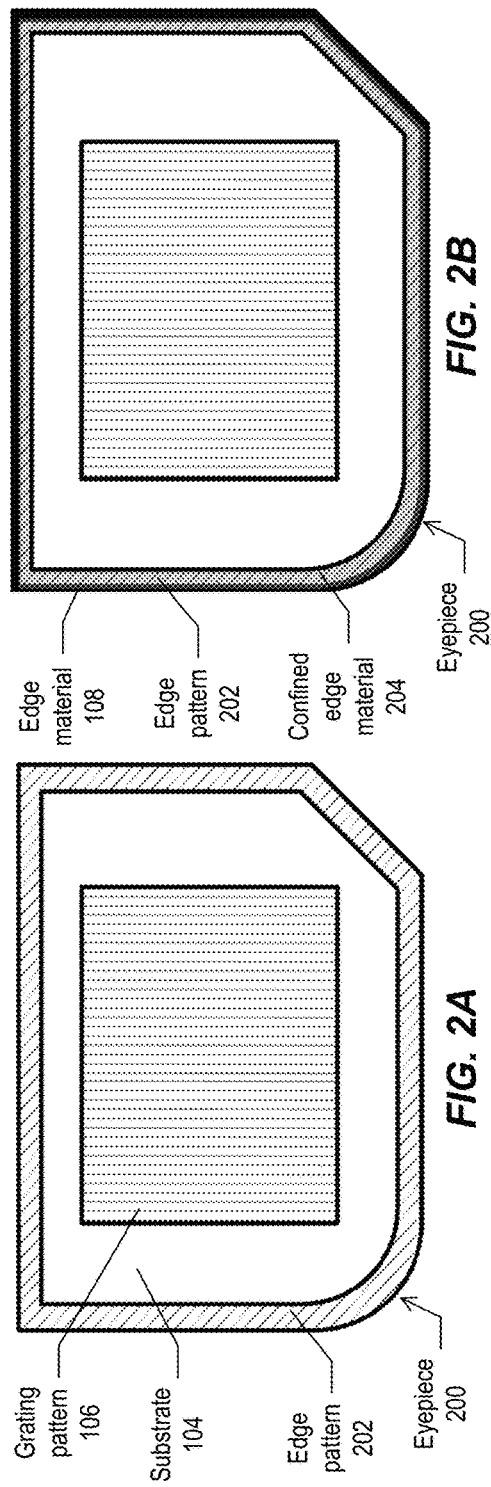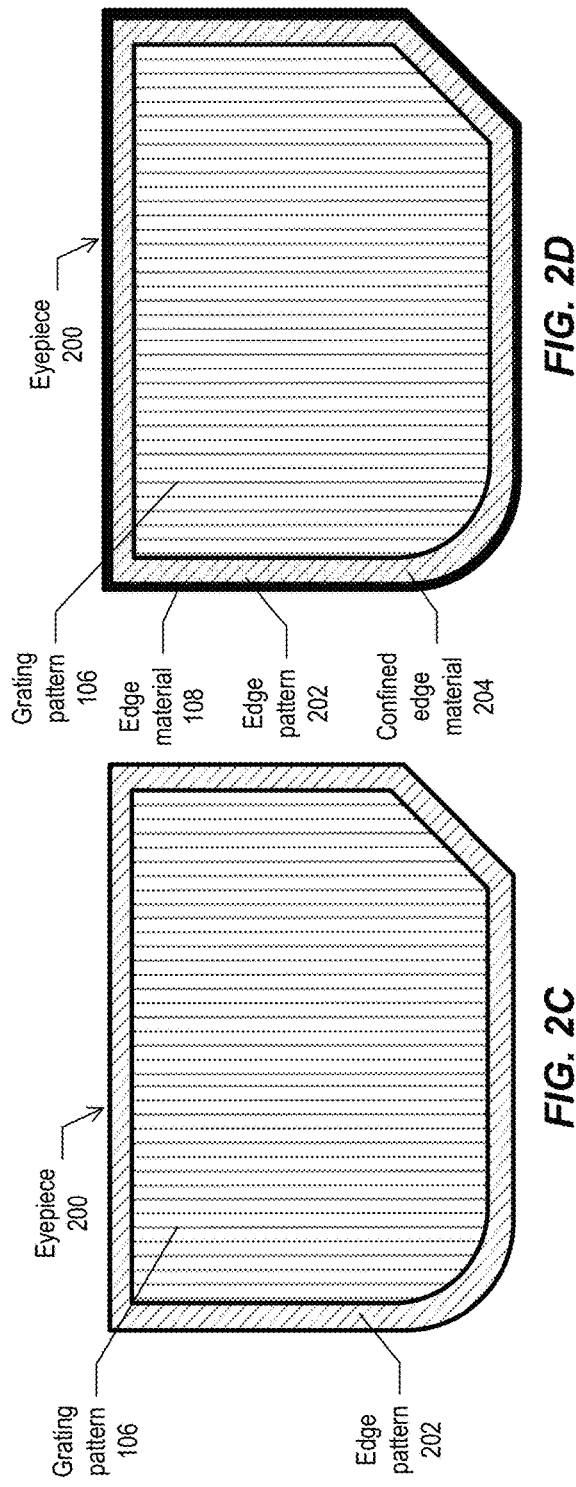

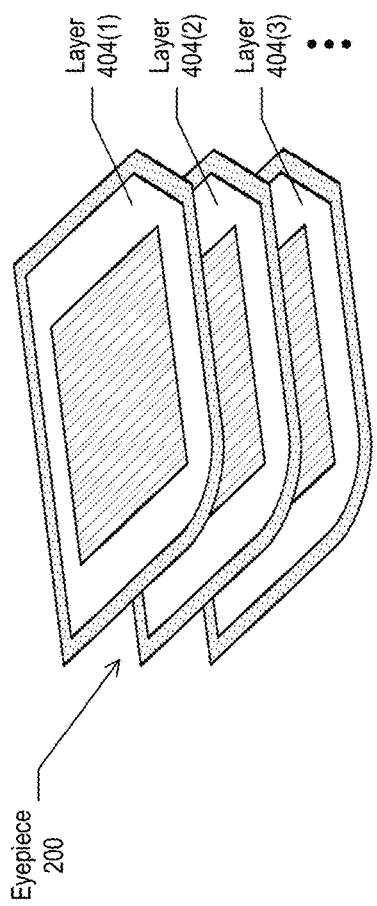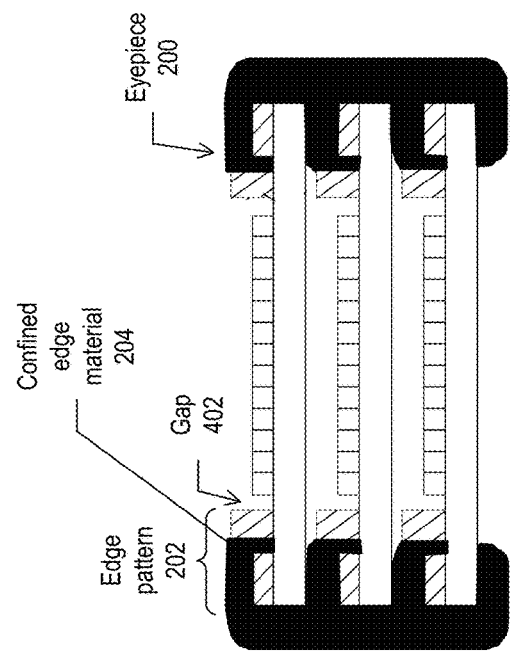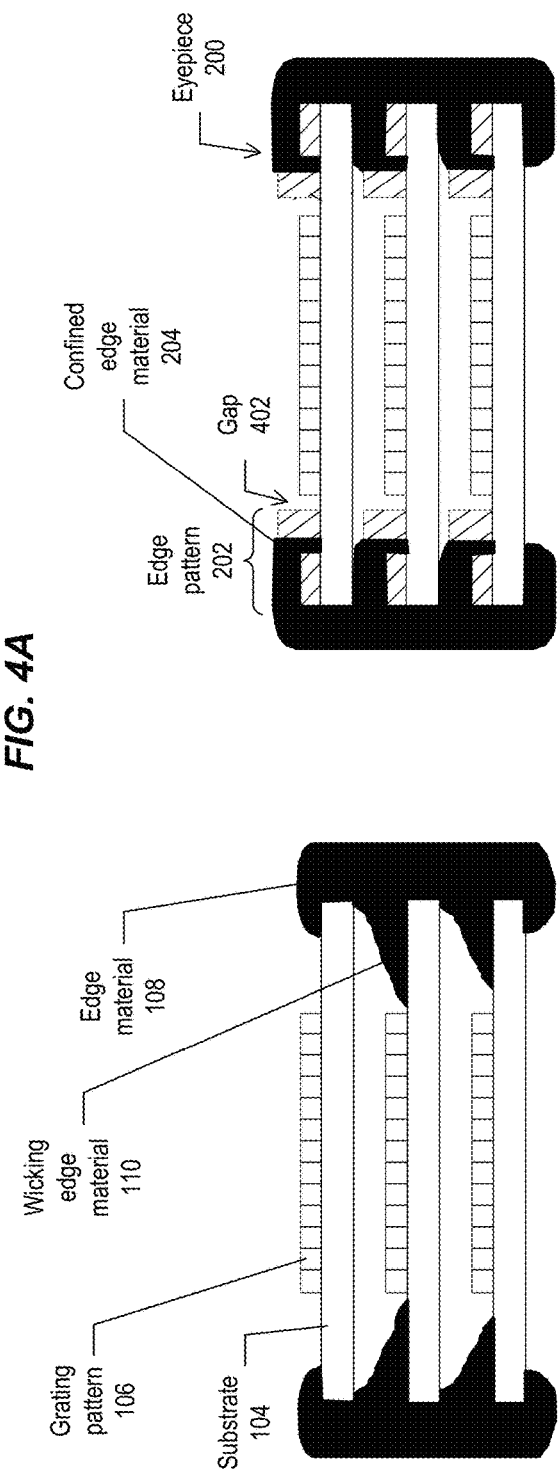
FIG. 4A
FIG. 4C
FIG. 4B (Prior art)

EDGE SEALANT CONFINEMENT AND HALO REDUCTION FOR OPTICAL DEVICES

CROSS-REFERENCE TO RELATED APPLICATION

The present disclosure is related to, and claims priority to, U.S. Provisional Patent Application Ser. No. 62/380,066, titled "Edge Sealant Confinement and Halo Reduction for Optical Devices," which was filed on Aug. 26, 2016, the entirety of which is incorporated by reference into the present disclosure.

BACKGROUND

Jet and Flash Imprint Technology (J-FIL™), developed by Molecular Imprints™ provides the ability to pattern various three-dimensional nano-structures on a surface using a mold that is formed with nano-structures. Ultraviolet (UV) curable liquid photoresist is flowed through the mold and cured with light. The mold is then separated from the cured photoresist, leaving behind shapes on a surface. An eyepiece may be composed of multiple layers of glass, and the J-FIL technique may be used to create diffraction gratings on the various layers of the glass. The layers may be stacked and glue may be employed to provide mechanical integrity and seal the assembly, with air gaps between the layers for optical performance. Traditionally in such assemblies, the glue may wick (e.g., flow) from the edges into the functional areas of the assembly, leading to optical degradation.

SUMMARY

Embodiments of the present disclosure are generally directed to an optical structure and/or optical device that includes multiple layers. More specifically, embodiments are directed to a multi-layer optical structure in which an edge pattern is imprinted on at least some of the layers to inhibit or prevent, and otherwise control, the flow of an edge adhesive into a grating pattern that is imprinted onto the various layers.

In general, innovative aspects of the subject matter described in this specification can be embodied as a structure (e.g., an optical structure) that includes a substrate including an edge grating pattern that is proximal to an edge of the substrate, the edge grating pattern including one or more features arranged to control capillary flow of a material from the edge of the substrate into the edge grating pattern.

Embodiments can optionally include one or more of the following features.

In some embodiments, the edge grating pattern is on a first surface of the substrate, and the substrate further includes a second grating pattern on a second surface of the substrate.

In some embodiments, the second grating pattern is a functional grating pattern that includes one or more of an orthogonal pupil expander (OPE) region and an exit pupil expander (EPE) region.

In some embodiments, the one or more features are arranged to be substantially perpendicular to the edge of the substrate.

In some embodiments, the one or more features include one or more of a V-shaped grating pattern, an S-shaped grating pattern, and a rectangular grating pattern.

In some embodiments, the edge grating pattern further includes one or more second features arranged to inhibit the capillary flow of the material beyond the edge grating pattern.

In some embodiments the one or more second features are arranged to be substantially parallel to the edge of the substrate.

In some embodiments, the one or more second features differ, at least in part, from the one or more features in at least one of depth, height, and width.

In some embodiments, the material has a refractive index that is lower than that of the substrate.

In some embodiments, the material, as applied, has a gradient of refractive index that varies according to a distance from the edge of the substrate.

In some embodiments, the one or more features have a cross-sectional shape of at least one polygon.

In some embodiments, the at least one polygon includes one or more of a triangle, a square, and a rectangle.

In some embodiments, the substrate is a waveguide configured to receive and propagate light; and the material is a light variable absorptive edge material configured to receive and absorb light from the waveguide.

In some embodiments, the material and the substrate have a substantially same index of refraction.

In some embodiments, the material comprises a doping agent and an adhesive.

In some embodiments, the doping agent is distributed at a gradient that varies with distance from an edge of the waveguide.

In some embodiments, the doping agent comprises carbon black nanoparticles.

In some embodiments, the carbon black nanoparticles have a diameter in a range of 50-70 nm.

In some embodiments, the material comprises at least one layer of adhesive tape.

In some embodiments, the adhesive tape comprises a doping agent and an adhesive.

In some embodiments, the adhesive tape and the substrate have a substantially same index of refraction.

In some embodiments, the substrate is one of a plurality of layers of substrate included in the optical structure, each of the plurality of layers includes the edge grating pattern proximal to a respective edge of the layer, and the material is an edge adhesive that is applied along at least a portion of a perimeter of the optical structure to secure the plurality of layers of substrate.

In some embodiments, each of the plurality of layers of substrate further includes a second grating pattern.

In some embodiments, the edge grating pattern is arranged to provide for a capillary flow of the edge adhesive into the edge grating pattern, and is further arranged to inhibit the capillary flow of the edge adhesive into the second grating pattern.

In some embodiments, the second grating pattern is of a nano-scale and operate as a waveguide for light propagation; and the edge grating pattern is one or more of a micro-scale and a nano-scale.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

BRIEF DESCRIPTION OF DRAWINGS

FIGS. 1A-1D depict an example eyepiece according to the prior art, the eyepiece exhibiting wicking of edge material into the gaps between layers.

FIGS. 2A-2D depict an example eyepiece including an edge pattern to confine edge material, according to some embodiments of the present disclosure.

FIG. 4A depicts a cross-sectional view of an example eyepiece including multiple layers, according to some embodiments of the present disclosure.

FIG. 4B depicts a cross-sectional view of an example eyepiece according to the prior art, the eyepiece exhibiting wicking of edge material into the gaps between layers.

FIG. 4C depicts a cross-sectional view of an example eyepiece including an edge pattern to confine edge material, according to some embodiments of the present disclosure.

DETAILED DESCRIPTION

Figure 3A:
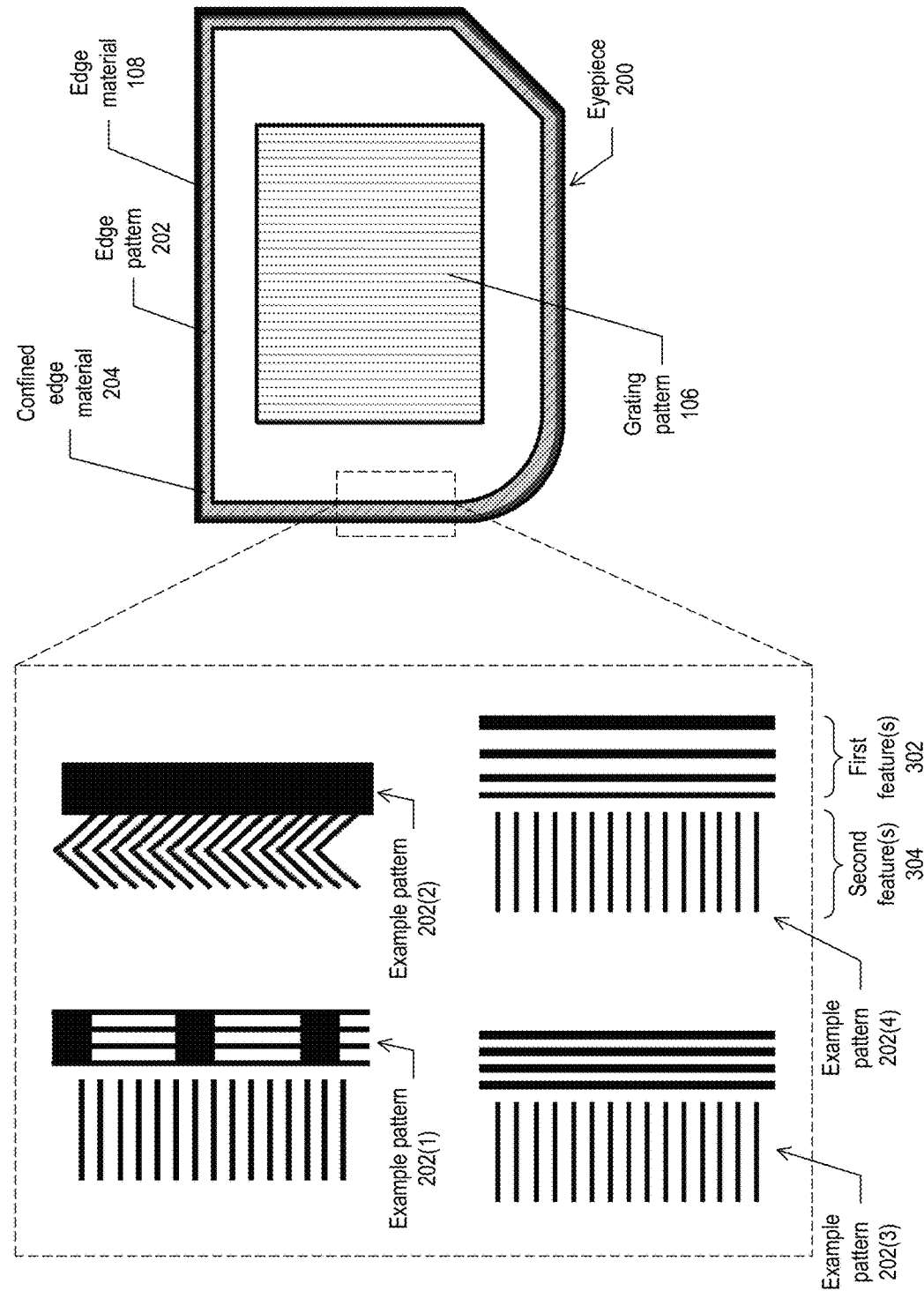
FIG. 3A depicts examples of substantially linear edge patterns that may be employed to prevent wicking of edge material, according to some embodiments of the present disclosure.

Embodiments of the present disclosure are directed to using confinement structures and/or pattern gratings to reduce or prevent the wicking of sealant polymer (e.g., glue) into the optically active areas of a multi-layered optical assembly. Embodiments are further directed to improving adhesion between layers of an optical assembly, thus improving the structural integrity. Embodiments are further described to utilize a progressively doped sealant material to reduce reflective instances within the optical assembly, or halo effects, thus improving the optical function of an eyepiece or other multi-layer diffraction grating assembly.

An eyepiece may be composed of multiple layers of (e.g., high index) glass in a stack. The J-FIL technique may be used to create diffraction gratings on the layers of the glass of the eyepiece to create waveguide displays. Each layer may be a thin layer of glass with polymer gratings created on its surface using J-FIL. The diffraction gratings may provide the basic working functionality of the eyepiece. Once the diffraction gratings are formed onto a large, broad glass layer, the glass layer may be laser cut into the shape of the eyepiece. Each layer of glass may be a different color, and there may be multiple depth planes. A larger number of planes may provide for a better virtual experience for a user using the eyepiece. The layers may be stacked using the sealant polymer (e.g., glue dots), and the whole stack may be sealed using the sealant. Air gaps between the layers may be needed for the optical performance of the eyepiece. The gaps between the layers may have controlled dimensions (e.g., substantially uniform width). The edge sealant polymer (also described herein as glue) may be applied around the edge of the layered structure to seal the stack and air gaps from the outside environment. The edge seal glue also provides a physical lock to ensure mechanical integrity of the structure, while keeping out contamination and moisture. Without such a seal, the layers may fall apart and delaminate from one another. However, because edge seal glue is liquid, it may wick (e.g., flow) into the gaps between the layers, into the functional area (e.g., diffraction gratings) of the structure, and degrade the optical performance of the eyepiece.

In some embodiments, the polymer is in contact with both layers of the waveguide stack. Such dual contact is especially critical for those embodiments that employ an ultraviolet (UV) acrylate-based polymer curing material. In these embodiments, the contact with both the layer above and below the wicked polymer ensure ensures proper UV cure and limits oxygen inhibition. Uncured or undercured polymer produces undesirable characteristics such as poor adhesion to glass, inferior mechanical properties, lower glass transition temperature, and/or others. FIG. 4B illustrates wicking with poor contact between the layers of the waveguide stack. FIG. 4C illustrates proper contact, as facilitated by edge confinement structures as described throughout this disclosure.

Some embodiments provide additional features, edge confinement structures, that are imprinted onto the glass. Such edge confinement structures may have different shapes (e.g., gratings, pillars, polygons, honeycomb hexagonal lines, etc.) and/or heights compared to those of the non-edge diffraction gratings in the interior of the structure. The edge confinement structures may be inset from the edge of the glass layers, and may act as a dam to prevent the edge seal glue from wicking into the interior of the eyepiece, into the area of the functional non-edge diffraction gratings. J-FIL may be used to create both the functional region of the optics, e.g., non-edge diffraction gratings, and the edge confinement features for mechanical packaging of the device to prevent wicking of the edge seal glue into the functional region.

In some embodiments, using the J-FIL drop-on-demand process, UV curable material that forms a confinement region along the perimeter of a diffraction grating eyepiece is co-imprinted with optically functional diffraction gratings. The combination of the optically active diffraction gratings with the confinement structures may be efficiently achieved by incorporating the confinement structures into the patterned master that is utilized as the original source for the eyepiece diffraction gratings. Upon replication steps from the master to submaster, and then to the substrate, these confinement structures may be imprinted during the same process in which the diffraction gratings are imprinted. In some embodiments, the confinement structures are arranged along the perimeter of the eyepiece such that after a larger substrate is patterned using J-FIL, and subsequently singulated (e.g., laser cut) into the shape of the eyepiece, these confinement structures run parallel (or substantially parallel) and/or adjacent to the singulated edge. The confinement structures may be arranged to reduce and/or restrict the lateral flow of edge sealant polymer (e.g., the bonding glue dots) from the edge of the eyepiece stack (e.g., the multi-layer diffraction grating eyepiece) towards the functional non-edge eyepiece gratings. Such flow would occur otherwise through natural capillary action, with a narrower gap between layers providing for a string capillary action pull of the glue into the interior of the structure. Further, as described above in relation to FIG. 4C, such confinement structures may further improve polymer contact between layers to improve curing and structural integrity.

Such confinement structures may resist the flow of the low viscosity photoresist in the J-FIL process, but have not been previously been used to prevent wicking of polymer sealant. Moreover, the confinement structures described herein may be imprinted and/or structured differently compared to the structures that are used to resist the flow of the low viscosity photoresist in the J-FIL process. In particular, structures that are used to merely resist the flow of the photoresist may be inadequate to prevent the capillary action wicking of the sealant. For example, a grid layout has been previously used to resist the flow of photoresist, whereas the embodiments of confinement structures as disclosed herein may include a set of parallel ridges running along the perimeter to block the capillary flow of the sealant. In general, previously used structures may have been designed to control the flow of photoresist through a particular structure formation, whereas embodiments disclosed herein provide confinement structures that are arranged to prevent the flow of sealant altogether, redirect the flow of the sealant along perimeter to prevent wicking into the interior of the structure, and/or improve manufacturing and structural metrics. In some embodiments, the sealant may have a higher viscosity than the photoresist. The sealant may be applied (e.g., coated) along the edge of the stacked layers of the eyepiece, instead of being dispensed as discrete droplets such as the photoresist dispensed in a J-FIL process.

In some embodiments, a confinement structure may include a nanoimprinted, cured set of parallel lines that runs parallel (or substantially parallel) to the edge of the eyepiece. As the edge seal begins to permeate the gap between eyepieces layers, capillary force draws the edge seal polymer along the perimeter rather than into the interior of the eyepiece stack. The use of the sealant enables creation of high contrast eyepieces by absorbing stray light that hits the edges of the eyepiece layers, as described later in this disclosure. The sealant also provides structural integrity for (e.g., "locks in") the mechanical gap and co-planarity of the eyepieces. Without the use of confinement structures as described herein, the pooled sealant could have adverse properties by eventually contacting the eyepiece diffraction gratings that are inside the gap between two layered substrates of the eyepiece. Upon contacting these, the capillary force would draw the sealant resin or glue into the diffraction grating, thus degrading the optical function of the eyepiece by at least partly filling the diffraction gratings.

Moreover, in some embodiments, the capillary force that would draw the sealant along the perimeter may be enhanced by the nanostructure of the confinement structures. For example, the confinement structure may prevent wicking of sealant into the interior of the eyepiece while also facilitating the propagation of the sealant along the edge of the eyepiece. Because the capillary force may aid the distribution of the sealant along the edge, a sealant extruder or other sealant delivery device may not be needed to apply sealant along the entire circumference of an eye piece. Instead, a sealant delivery device may apply sealant to one or more locations along the circumference. The confinement structures that include nanostructured line(s) that are parallel to the edge of the eyepiece may, through capillary action, distribute the sealant evenly to the remainder of the circumference. Thus, the confinement structures may also enable the use of a simpler, lower cost, mechanism for applying sealant to the edge of the eyepiece.

Although examples herein describe the use of an edge pattern to divert or otherwise control the wicking flow of an adhesive and/or light-absorptive edge material into the interior of the eyepiece, embodiments are not so limited. The techniques described herein can also be used to control the flow of a material that may not be adhesive and/or light-absorptive. Additionally, while many embodiments described have edge patterns on the same side of a waveguide as diffractive gratings in a functional area of an eyepiece, it is possible for the edge patterns and diffractive gratings to be fabricated on opposite sides of a waveguide. In some embodiments, one or more of the edge patterns and diffractive gratings may be disposed on one or more sides of a waveguide substrate.

FIGS. 1A-1D depict an example eyepiece 100 according to the prior art, the eyepiece exhibiting wicking of edge material into the gaps between layers. As described above, the eyepiece may have any suitable number of layers of glass or other material, and each layer may act as a waveguide to allow the passage of various frequencies of light. Layers may be configured for particular wavelengths, so as to propagate light of a particular color, and the eyepiece may be configured for a particular optical power, to create a number of depth planes at which light through the waveguide may be perceived. For example, a first set of waveguide layers may include layers for red, green, and blue at a first depth plane, and a second set of waveguide layers may include a second set of layers for red, green, and blue light corresponding to a second depth plane. The order of the colors may be arranged differently in different depth planes to achieve the desired optical effects in the eyepiece. In some embodiments, a single (e.g., blue) layer may cover multiple depth planes.

A substrate 104 may be imprinted with a grating pattern 106, using the J-FIL method or other suitable technique. In the examples of FIGS. 1A and 1B, a portion of the substrate 104 has been imprinted with the pattern 106. In the examples of FIGS. 1C and 1D, the entire surface of the substrate 104 has been imprinted with a pattern 106. In general, any suitable distance may separate the edge of the substrate 104 and the beginning of the imprinted grating pattern 106.

As shown in the examples of FIGS. 1B and 1D, an edge material 108 has been applied along the edge of the eyepiece. The edge material 108 may be a glue, resin, polymer sealant, ink, and/or other viscous material. As illustrated, and as commonly occurs in the prior art, some of the edge material 108 has flowed into the interior of the eyepiece, away from the edges, as wicking edge material 110. As described above, such wicking may be caused by capillary action that draws the edge material 108 into the gaps between layers in the eyepiece. Such wicking may degrade the optical function of the eyepiece.

FIGS. 2A-2D depict an example eyepiece 200 including an edge pattern to confine edge material, according to some embodiments of the present disclosure. As in the examples of FIGS. 1A-1D, a substrate 104 has been imprinted with a grating pattern 106, using the J-FIL method or other suitable technique. In the examples of FIGS. 2A and 2B, a portion of the substrate 104 has been imprinted with the pattern 106. In the examples of FIGS. 2C and 2D, a greater portion of the surface of the substrate 104 has been imprinted with a pattern 106.

In the examples of FIGS. 2A-2D, an edge pattern 202 has been applied along the edge of the eyepiece 200. In some instances, each layer of the eyepiece may have the edge pattern 202 applied. Alternatively, a subset of the layers may have the edge pattern applied. Possible edge patterns are described further with reference to FIGS. 3A and 3B. In some instances, as in FIGS. 2C and 2D, the edge pattern 202 may extend up to the beginning of the grating pattern 106. In some instances, as in FIGS. 2A and 2B, there may be some space between the edge pattern 202 and the grating pattern 106. As shown in FIGS. 2B and 2D, the flow of the edge material 108 may be confined to the edge pattern 202, as confined edge material 204, at least partly (or entirely) preventing the edge material from reaching the grating pattern 106 and thus degrading the functionality of the optically active portion of the layers.

In some instances, the gap between layers of the eyepiece may be on the order of tens of microns (e.g., a 30 micron gap). The width of the applied edge material may be on the order of millimeters. The grating patterns for the pattern 106 and/or edge pattern 202 may be on a smaller scale, e.g., nano-scale gratings. Given the small scale of the nano-scale gratings, such gratings may exhibit a very strong capillary action to draw the edge material 108 into the grating pattern 106. To prevent the edge material 108 from wicking too far into the interior of each layer, and thus degrading the optical performance of the layers by filling in the grating pattern 106, the edge pattern 202 may extend from the edge of each layer into the interior a distance on the order of millimeters. The edge pattern 202 may allow the edge material 108 to effectively exhaust its capillary action in the "dummy" pattern of confinement structures, such that the edge material 108 is prevented from flowing into the grating pattern 106. In some embodiments, edge pattern 202 extends ten microns into the eyepiece. Alternatively, the edge pattern 202 can extend further, e.g., as far as five millimeters. Ancillary considerations such as adhesive properties desired, the type of polymer used for sealant material, and/or the amount of light absorption desired can determine the amount of sealant utilized and thus the depth of the edge pattern to be used.

In some embodiments, the edge pattern 202 may be applied in a same step or same pattern application process as the grating pattern 106, e.g., using J-FIL. The edge pattern 202 may be co-patterned along with the grating pattern 106 in the same patterning process. Alternatively, the edge pattern 202 may be applied in a separate process, before or after the application of the grating pattern 106. The J-FIL application process can spatially control the volume density of the photoresist that is applied to a substrate. A master pattern that is applied using J-FIL may be a mixture of different sized features. For example, nano-scale gratings may be used for the eyepiece grating pattern 106, whereas a deeper micro-scale or nano-scale grating may be used for the edge pattern 202 that controls the flow of the edge material 108. The patterning may be performed at the same time and/or during the same application process, and more (e.g., a thicker layer of) photoresist may be deposited to the areas that are to have the deeper features for edge control compared to a thinner depositing of photoresist in the areas that are to have the nano-scale patterning, such as the optically functional grating pattern 106 region of the eyepiece. In some instances, optimal function of the eyepiece may require a very thin residual layer of unpatterned photoresist under the nano-scale grating 106, between the waveguide surface and the grating. Use of J-FIL for depositing different thickness layers of photoresist provides an advantage over traditional techniques, given that the area of the grating pattern 106 requires a thin layer (e.g., as thin as feasible) of photoresist to be deposited, whereas the area of the edge pattern 202 requires a much thicker layer of photoresist to support the edge pattern that is more deeply etched, e.g., micro-scale compared to nano-scale etching of the grating pattern 106. As used herein, nano-scale refers to a distance scale on the order of (e.g., one to hundreds of) nanometer(s), whereas micro-scale refers to a distance scale on the order of one to hundreds of micron(s), and millimeter-scale refers to distance scale on the order of one to hundreds of millimeters.

Although the examples herein include a particular pattern (e.g., vertical lines), embodiments are not limited this example. Any suitable pattern may be imprinted to achieve desired optical functionality in the eyepiece. Moreover, although the example eyepieces herein may have a particular shape (e.g., that of a lens in eyeglasses), the eyepiece may have any suitable shape.

FIG. 3A depicts example edge patterns 202 that may be employed to prevent wicking of edge material, according to some embodiments of the present disclosure. As illustrated in FIG. 3A, the edge of the eyepiece is located to the left of each of the examples 202(1)-202(4), such that the right side of each example of toward the interior of the eyepiece, e.g., toward the grating pattern 106. As shown in the examples 202(1) through 202(4), the edge pattern 202 may include two type of features. First feature(s) 302 may include one or more etched lines that run parallel (or approximately parallel) to the edge. Such feature(s) may block the edge material 108 (e.g., glue, resin, sealant, etc.) from penetrating to the grating pattern 106. The feature(s) 302 may also redirect the edge material 108 to flow parallel to the edge instead of perpendicular to the edge, e.g., inward toward the grating pattern 106. Second feature(s) 304 may include lines that run perpendicular, or substantially perpendicular, to the edge, to allow the edge material 108 to flow inward for some distance from the edge before being blocked by the first (e.g., parallel) features 302. In some embodiments, the edge pattern may include second feature(s) 304 such as a set of lines running perpendicular (or approximately perpendicular) to the edge, as in examples 202(1), 202(3), and 202(4). In some embodiments, the edge pattern may include second feature(s) 304 that guide the edge material 108 along a more complex path, such as the V-shaped or chevron shaped pattern of example 202(2). Some embodiments support the use of any suitable pattern for the edge pattern 202. For example, the pattern 202 may include second feature(s) such as serpentine or S-shaped curves instead of the V-shaped chevron pattern of example 202(2). The use of a V-shaped, S-shaped, or other type of pattern may function to gradually slow down the viscous flow of the edge material 108 as it progresses along the patterned channels.

The second feature(s) 304 may function to pull the edge material 108 inward in a controlled manner until the edge material 108 runs up against the first feature(s) 302, which act as a dam or block to prevent the edge material 108 from penetrating any further into the interior. The second features 304 may also facilitate the balanced distribution of the edge material 108 along the circumference of the edge. In some embodiments, the first features 302 may have a different width dimension compared to the second features 304. For example, as shown in examples 202(2) through 202(4), the first features 302 may include wider etched channels compared to the second features 304. The second features 304 may also have different heights compared to the first features 302. For example, the first features 302 may extend higher, or be etched deeper, than the second features 304. The different dimensions, e.g., height, depth, and/or width, of the first feature(s) 302 may provide a more effective dam or block to inhibit the flow of the edge material 108.

Although FIG. 3A shows various examples of edge patterns 202 that may be employed, embodiments are not limited to the examples shown. Some embodiments may employ edge patterns 202 of any suitable design, size, or other arrangement to confine the flow of the edge material 108 away from the functional portion of the eyepiece. In some instances, the particular depth, width, and/or design of the edge pattern 202 may be based at least partly on the viscosity or other characteristics of the edge material 108. For example, a first edge pattern 202 may optimally confine an edge material 108 of a particular viscosity whereas a second, different edge pattern 202 may optimally confine a different edge material 108 having a different viscosity.

Figure 3B:
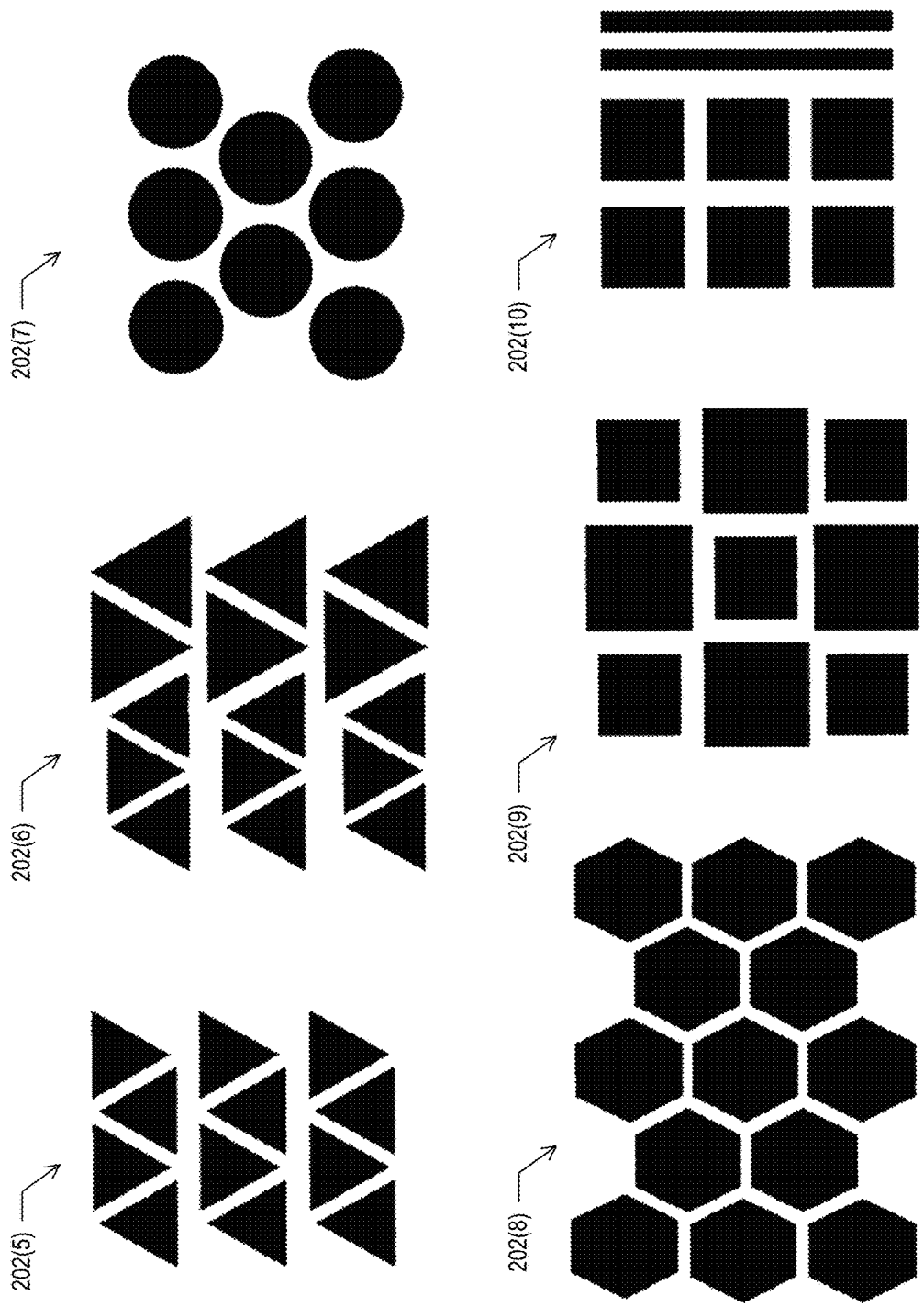
FIG. 3B depicts examples of pillar edge patterns that may be employed to prevent wicking of edge material, according to some embodiments of the present disclosure.

FIG. 3B depicts example grating patterns as pillar structures 202(5) through 202(10) that may be utilized to yield results similar to those resulting from use of example patterns 202(1) through 202(4). Each pillar grating pattern may have, in addition to a cross-sectional geometry, a height extending in a z direction from a surface of a substrate. The plurality of spaced-apart pillars, in addition to having variable geometries, may have variable sizes as well.

As depicted in FIG. 3B, the example triangle pillars 202(5), which may have variable height in a z-direction among the depicted pillars, have a common size and geometry, while the example triangular pillars 202(6) may have variable size among the various pillars to control the rate of wicking by capillary action as a function of variable pitch volume between the pillars across the pattern. Other shapes and combinations, such as circular pattern 202(7), hexagonal pattern 202(8), and/or square pattern 202(9), may achieve similar function. Additionally, some embodiments may utilize combinations, such as circular pillars nearer the edge and triangular pillars nearer a functional area, or such as example pattern 202(10) with square pillars to facilitate wicking into the pattern and linear gratings to provide a flow control in desired orientations. In some embodiments, linear gratings as shown in example pattern 202(10) may be substantially parallel with one or more edges of a waveguide. Embodiments may also employ other suitable patterns, including any suitable modifications or derivations from the example configurations shown in FIGS. 3A and 3B.

FIG. 4A depicts a cross-sectional view of an example eyepiece 200 including multiple layers, according to some embodiments of the present disclosure. As shown in the example of FIG. 4A, the eyepiece 200 may include any appropriate number of layers 404 which are separated from one another by a gap. The gap between layers 404 may be of any suitable width to achieve the desired optical functionality. Each layer 404 may include a substrate, a grating pattern 106 in the optically functional region of the eyepiece, and an edge confinement area that has been etched with an edge pattern to inhibit or prevent the flow of edge material into the grating pattern 106.

FIG. 4B depicts a cross-sectional view of an example eyepiece 100 according to the prior art, the eyepiece exhibiting wicking of edge material into the gaps between layers. As shown in this cross-sectional view, the edge material is flowing through the gaps between layers toward the functional region that includes the grating pattern 106. As described above, the impinging of the edge material 108 into the grating pattern 106 may degrade or effectively destroy the functionality of the eyepiece.

FIG. 4C depicts a cross-sectional view of an example eyepiece 200 including an edge pattern 202 to confine the edge material 108 from the grating pattern 106, according to some embodiments of the present disclosure. As shown in the example of FIG. 4C, the edge pattern 202 includes two sets of features 302 and 304 having different heights and/or depths. The presence of the edge pattern 202 has effectively confined the edge material 108, preventing it from reaching the grating pattern 106 through capillary action, and improving the adhesion and curing properties of the edge material 108 during manufacture.

In some embodiments, as shown in the example of FIG. 4C, there may be gap 402 between the edge pattern 202 and the grating pattern 106. This gap 402 should not be confused with the gap(s) between layers 404 of the eyepiece. In some embodiments, the gap 402 may have a width that is on the order of tens of microns. In some embodiments, the gap 402 may have a different width at different positions along the eyepiece. For example, the gap 402 may have a different width near the nose compared to near the temple, as the eyepiece is being worn by an individual. The width of the gap 402 may be a function of the optics, e.g., according to the desired optical properties at particular positions along the circumference of the edge. In some embodiments, an edge pattern 202 may be imprinted on both sides of layer 404.

Figure 5A:
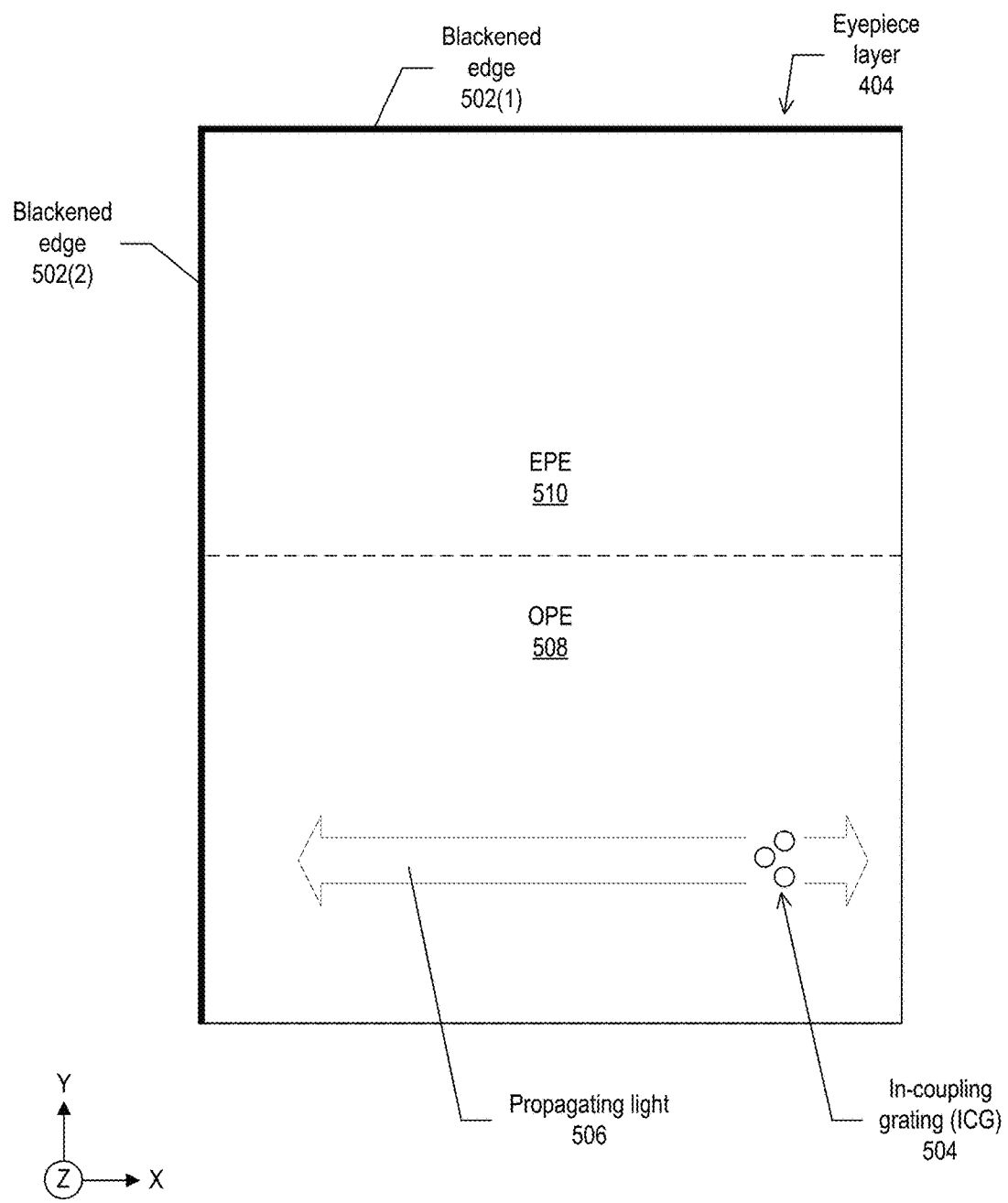
FIG. 5A depicts an example layer of an eyepiece, according to some embodiments of the present disclosure.

FIG. 5A depicts an example layer 404 of an eyepiece 200, according to embodiments of the present disclosure. In the example of FIG. 5A, a layer is depicted having a rectangular shape. Some embodiments may also employ layers of different shapes, such as the eyepiece shapes shown in the previous figures. FIG. 5A shows a top-down view of a layer, in which the X- and Y-directions are along the surface of the layer and the Z-direction is orthogonal to the surface of the layer.

As shown in FIG. 5A, a layer may include one or more incoupling gratings (ICGs) 504 where light may be introduced into the layer. In the example of FIG. 5A, the ICG 504 is shown as three dots. Additional embodiments support other suitable arrangements for the ICG. Light 506 may propagate along the X-direction from the ICG 504 toward the left edge of the layer, according to the waveguides created in the layer by the grating pattern 106. Light may also propagate along the X-direction toward the right edge of the layer. In some embodiments, the waveguides may be arranged to send more light preferentially in one direction, e.g., more toward the left than toward the right.

For example, the layer may include a blackened edge 502(2) and a blackened edge 502(1). If the edge(s) are not blackened, the propagating light 506 may reflect back off the edge toward the interior of the layer. Such reflection may cause undesirable "ghost" images in the eyepiece, e.g., when the eyepiece is used as a component in a wearable virtual reality and/or augmented reality device. Accordingly, edge blackening may prevent and/or reduce the intensity of ghost images. In some embodiments, the edge along the right-hand and/or lower side of the layer may also be blackened to prevent the occurrence of ghost images due to light reflecting off the respective edges. In other words, the entire periphery of the eyepiece (or at least a substantial portion thereof) is blackened in some embodiments. Embodiments may provide any suitable variations on selection of where to apply blackening to a particular location.

In some embodiments, the layer may include at least two different regions—an orthogonal pupil expander (OPE) region 508 and an exit pupil expander (EPE) region 510. As light 506 is propagating along the X-direction in the OPE region, at least some of the light is diffracted by grating patterns in the Y-direction towards and into the EPE region 510. In embodiments where the eyepiece is employed in a virtual reality and/or augmented reality device, the light is outcoupled from the EPE region 510 to the eye(s) of user where it is perceived as a virtual image. As discussed above, the top edge 502(1) may also be blackened to reduce or prevent the reflection of light that is propagating in the Y-direction, given that such reflected light may produce undesirable optical effects.

Figure 5B:
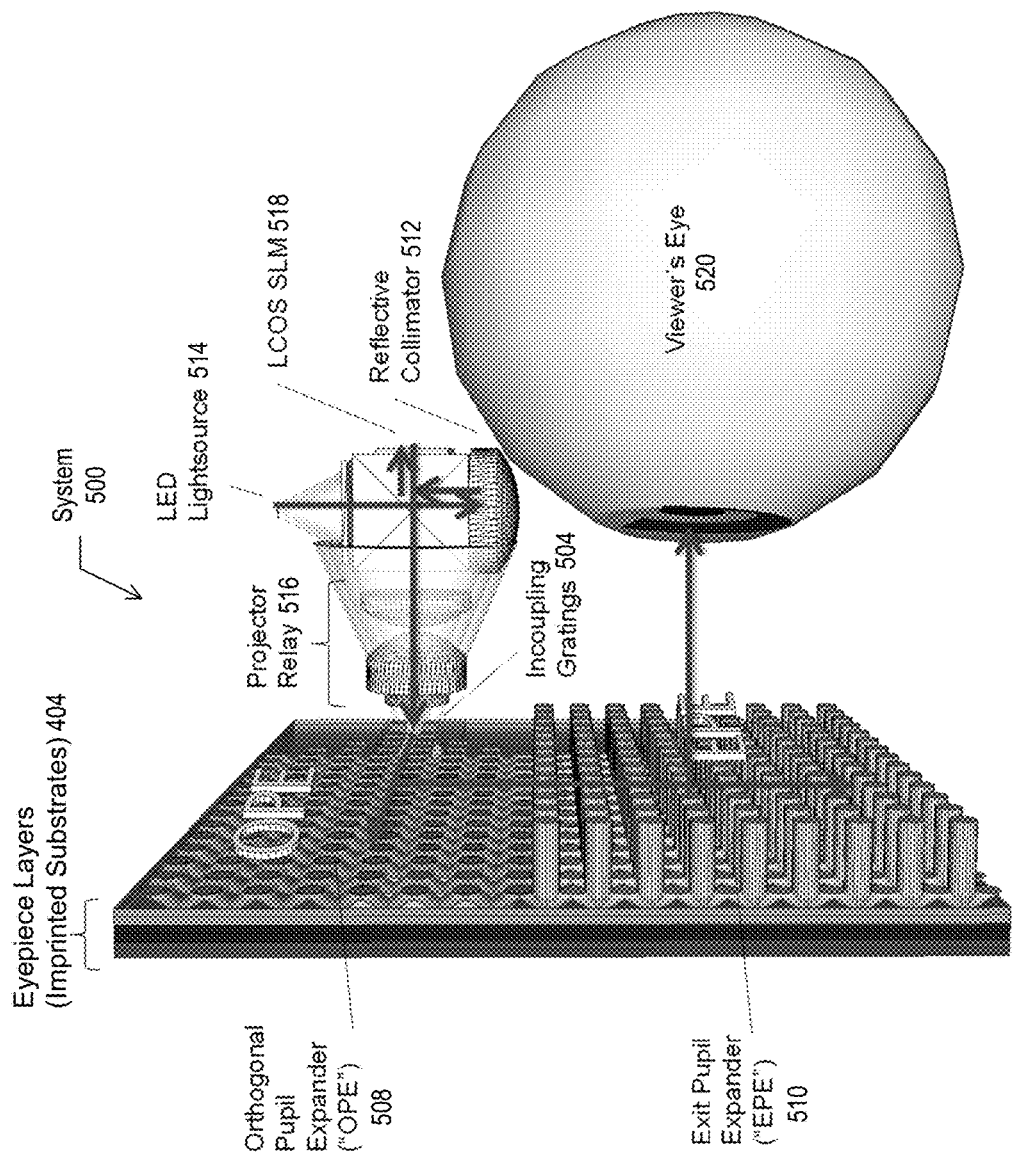
FIG. 5B depicts an example virtual reality and/or augmented reality system that employs a multi-layered eyepiece, according to some embodiments of the present disclosure.

FIG. 5B depicts an example virtual reality and/or augmented reality system 500 that employs a multi-layered eyepiece, according to embodiments of the present disclosure. As shown in the example of FIG. 5B, the system 500 may include a light emitting diode (LED) light source 514 that directs light onto a reflective collimator 512. The collimator 512 sends the collimated light to a liquid crystal on silicon (LCOS) SLM 518, which may direct a light signal via a projector relay 516 to ICG 504. The light signal may provide the virtual reality and/or augmented reality image(s) to be shown to the user through the system 500. As described above, the eyepiece may include any suitable number of layers 404 of imprinted substrates, and the eyepiece may include an OPE region 508 and an EPE region 510. The light directed into the OPE region may propagate across the OPE region and into the EPE region where it outcouples the light to the viewer's eye 520 and is perceived as the virtual and/or augmented reality image.

Blackening an edge of the multi-layer eyepiece may cause the absorption of light impinging on the edge, and/or provide for reduced reflection of light impinging on the edge. For example, in previously available devices the light reflected from an edge of the eyepiece may outcouple to the viewer's eye 520 and, because of the longer path of the reflected light to viewer's eye 520, there may be undesirable phase changes of the reflected light relative to the intended original light path and any image embodied by the light will appear distorted by the resulting phase interference. In other cases, the reflected light may propagate through eyepiece layers 404 completely and appear on LCOS SLM 518 again where it will be re-directed through the system as a "ghost" image. Such effects are reduced or eliminated using the edge blackening provided by various embodiments.

Various embodiments discussed herein support the use of any suitable process to blacken the edges of the eyepiece. For example, an epoxy such as Masterbond EP42HT-2 with a refractive index n≈1.6 may be mixed in a 2:1 ratio with carbon black. The blackened epoxy may be the edge material 108 that is employed to seal the eyepiece and provide mechanical integrity for the multi-layer arrangement as described above. Other suitable types of light-absorbing material may also be employed. Although examples herein describe the use of a carbon black-doped epoxy as the edge material 108, embodiments are not so limited. The edge sealant may be any suitable material, and may be light absorbing through the doping of a glue, resin, epoxy, or other adhesive with black chromate, carbon black, and/or other light absorbing substances.

Figure 6A:
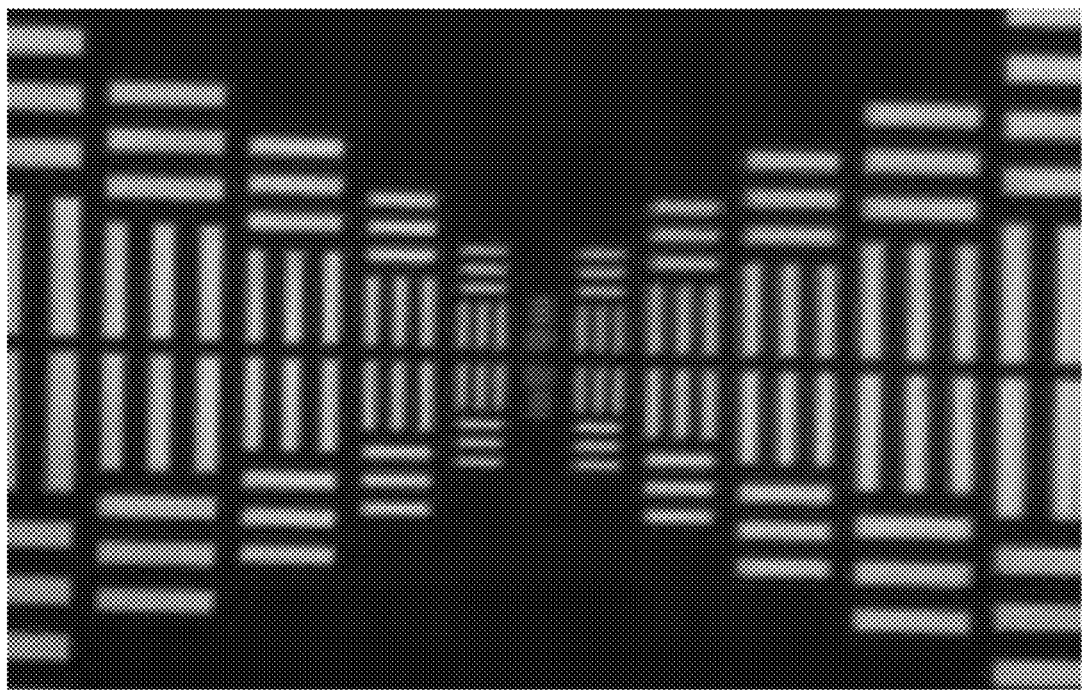
FIGS. 6A and 6B depict example test images in an eyepiece with unblackened and blackened edges respectively, according to some embodiments of the present disclosure.
Figure 6B:
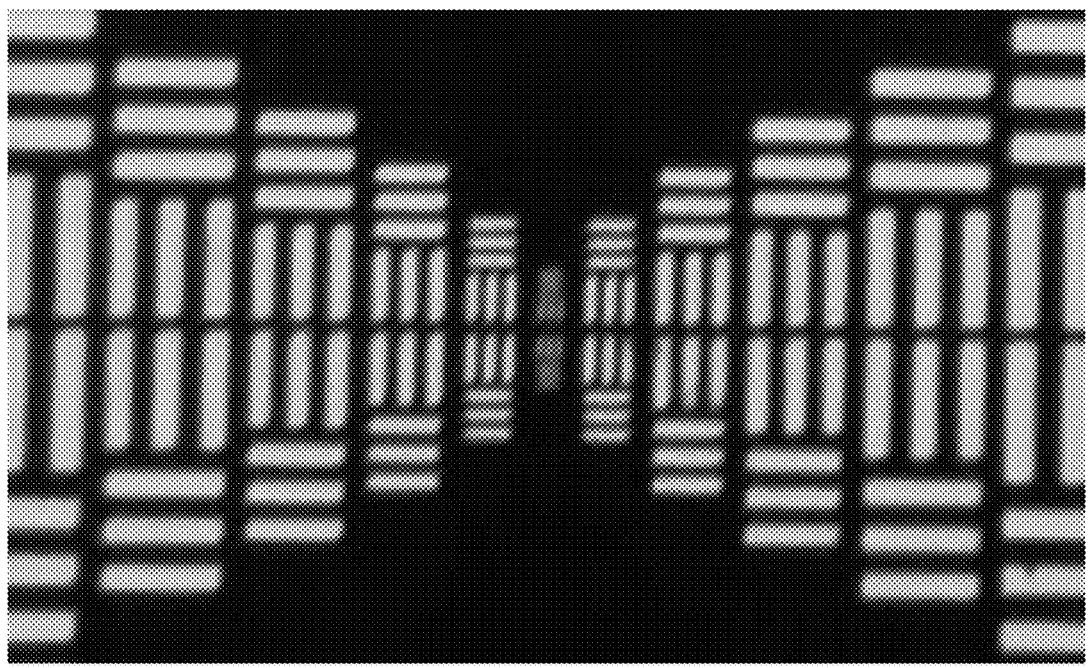

FIGS. 6A and 6B depict example test images in an eyepiece with unblackened and blackened edges respectively, according to embodiments of the present disclosure. These figures illustrate the optical effect of the edge blackening described with reference to FIG. 5A. Without the blackened edge(s), the test images exhibit lower contrast and less sharpness compared to when the edge(s) are blackened.

Table 1 shows measurements of ANSI contrast and sequential contrast for three experimental trials using an eyepiece without edge blackening treatment. Table 2 shows a similar measurement (for a single experimental trial) using an eyepiece with edge blackening treatment.

TABLE 1

|  | Mean | Standard deviation | Standard error |
|---|---|---|---|
| ANSI White | 38.15 | 1.45 | 3.8% |
| ANSI Black | 8.03 | 4.75 | 2.4% |
| ANSI Contrast | 4.75 | 0.12 | 2.4% |
| Full White | 47.00 | 2.43 | 5.2% |
| Full Black | 0.259 | 0.011 | 4.2% |
| Sequential Contrast | 181.3 | 1.8 | 1.0% |

TABLE 2

|  | Single trial |
|---|---|
| ANSI White | 19.27 |
| ANSI Black | 0.525 |
| ANSI Contrast | 36.7 |
| Full White | 19.994 |
| Full Black | 0.1124 |
| Sequential Contrast | 177.9 |

As shown in Tables 1 and 2, the ANSI contrast is substantially improved (e.g., 36.7 vs. 4.75) with blackened edge(s), whereas the sequential contrast is similar (e.g., 181.3 vs. 177.9). Sequential contrast is measured by comparing an off image to an on image, e.g., contrast over time as the image is switched on and off. ANSI contrast is the contrast between black and white for a particular image at a particular time. The blackening of edge(s) may also reduce the occurrence and/or prominence of halo effects that may occur in the eyepiece without blackening, such halo effects caused by reflection of light off of the edge(s).

Table 3 lists the results of absorption tests using different types of adhesives as the edge material 108, in particular carbon black-doped Norland 81 (with n=1.56), carbon black-doped Masterbond with n≈1.6, and Sapphire (@ 523 nm) with n=1.77, e.g., a refractive index that approximately corresponds to the refractive index of the substrate used in the layers of the eyepiece.

TABLE 3

| Adhesive | Refractive Index | Reflected Power (W) | Percentage Absorbed |
|---|---|---|---|
| Sapphire (@ 523 nm) | 1.77 | 1.42 mW | 0% |
| Norland 81 | 1.56 | 56.2 µW | 96% |
| Masterbond EP42HT-2 | ≈1.6 | 59.1 µW | 95.9% |

As shown in Table 1, use of a blackened adhesive (e.g., edge material 108) with a lower refractive index provides for a reduction of reflected power (e.g., of light reflecting off edges) of approximately two orders of magnitude, from milliwatts to tens of microwatts, and a high percentage of light absorbed at the edges. The percentage absorbed as calculated as 100−100*the reflected power of the adhesive/the reflected power of the Sapphire adhesive (e.g., used as a baseline comparison).

In some embodiments, an edge adhesive may be utilized that facilitates optical performance. In some embodiments, the edge adhesive may be absorptive to prevent reflection of light back through the eyepiece. In some embodiments, the edge adhesive exhibits a refractive index substantially similar to that of the eyepiece, as well as increasing concentrations of absorptive material as a function of distance from the edge to permit light to propagate into the edge adhesive and reduce light scatter from propagating back through the eyepiece. For example, the edge adhesive may have an increasing concentration of carbon doping (such as carbon nanoparticles 50-70 nanometers in diameter) as the edge is approached. Such a gradient may enable a progressive absorption of light, reducing the light scattering off the adhesive with an abrupt change in refractive index compared to the interior of the eyepiece as may occur with embodiments that attempt to absorb all light impacting it.

Figure 7:
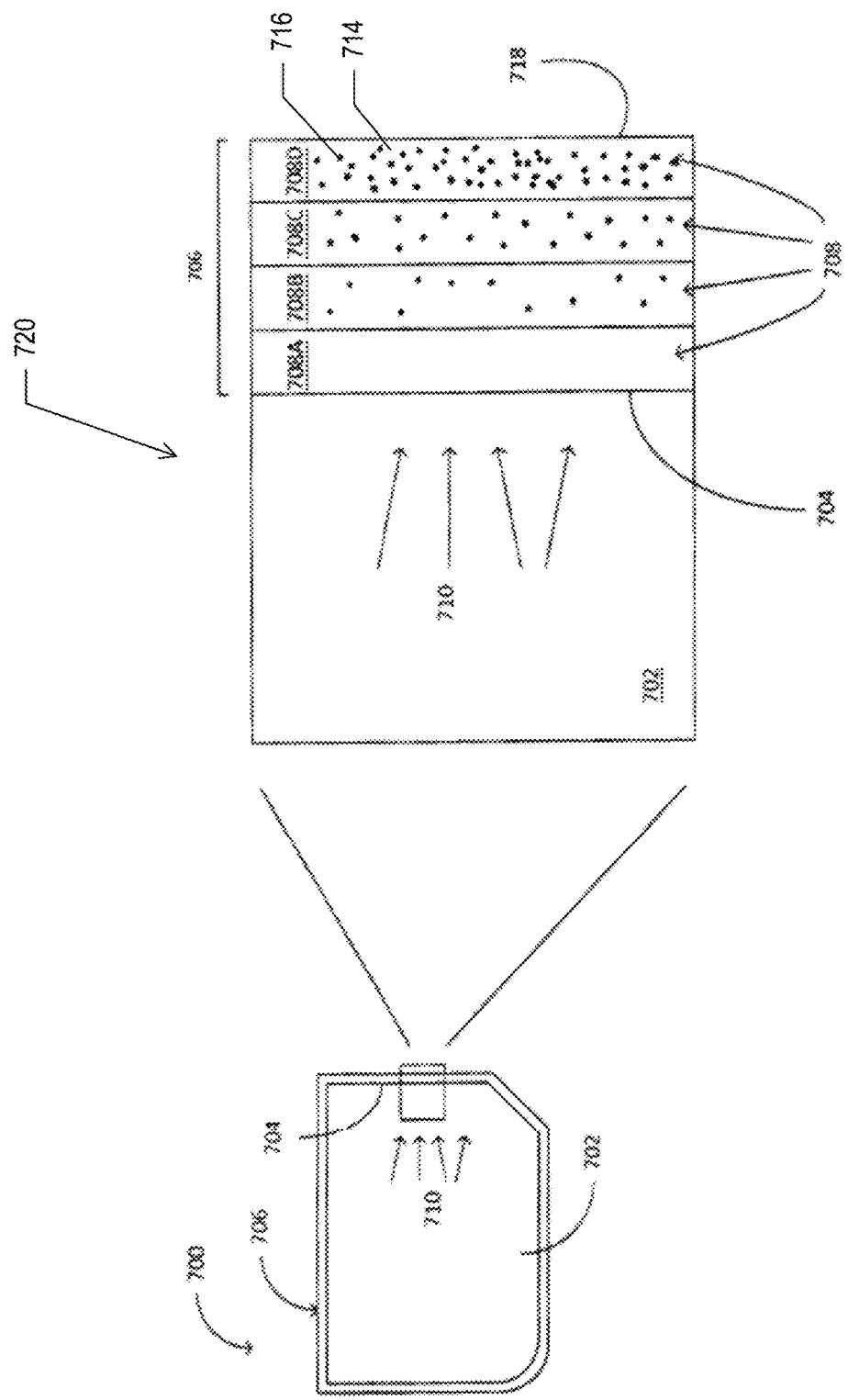
FIG. 7 depicts an example of a progressive gradient edge sealant by successive layers, according to some embodiments of the present disclosure.

FIG. 7 illustrates one or more embodiments with progressively varying concentration of absorptive material (e.g., carbon). Although examples herein describe the use of carbon as the absorptive material, embodiments may employ other suitable absorptive materials in various concentrations or arrangements. FIG. 7 depicts eyepiece 700 with an enlarged view of an edge portion 720 of the eyepiece 700. Eyepiece 700 includes an eyepiece stack 702 comprising layers of optical components. Eyepiece stack 702 includes an outer edge 704 on which an edge material 706 is disposed to seal outer edge 704 against outside contaminants, to provide reinforcement to resist delamination of the optical layers, and/or to mitigate the reflection and/or scattering of stray light 710 through the optical components. Edge material 706 may comprise multiple layers 708 of materials as illustrated in FIG. 7, though fewer or more layers are possible. Each layer may be the same material as one or more of the other layers with a substantially similar index of refraction relative to each other and eyepiece stack 702, or alternatively, different layers may be made of different materials. In some embodiments, at least one of the layers may comprise a doped material made up of one or more constituent materials, such as carbon nanoparticles. The ratio of the constituent materials may be different for each doped layer or may be substantially the same. In the embodiment shown in FIG. 7, four layers 708A, 708B, 708C, and 708D are disposed around outer edge 704 of eyepiece stack 702 and are described herein below.

In the embodiment illustrated by FIG. 7, first layer 708A may comprise a material, such as an epoxy, having a first index of refraction. The first index of refraction of first layer 708A may be similar to or substantially the same as the index of refraction of eyepiece stack 702 such that light 710 traveling toward outer edge 704 of eyepiece stack 702 may pass through an interface between outer edge 704 of eyepiece stack 702 and edge material 706 into first layer 708A. Matching the index of refraction between eyepiece stack 702 and first layer 708A allows for light 710 to pass through the interface with minimal refraction, reflection, and/or scatter of light back toward eyepiece stack 702. First layer 708A acts to receive a majority of light 710 from eyepiece stack 702 into the edge material 706. In some embodiments, light 710 may then pass through first layer 708A toward second layer 708B. In some embodiments, first layer 708A includes absorptive doping material in a desired concentration to absorb at least a portion of light passing through it.

Second layer 708B may include a doped material. In the example shown in FIG. 7, second layer 708B may include a base material 714, such as epoxy, with particles 716 embedded in base material 714. Several design variables may be adjusted to provide desired performance of layer 708B and edge material 706. For example, particle material, particle size, particle-to-base material ratio, and epoxy material are some of the design variables that may be adjusted for optimization.

In some embodiments, the embedded particles 716 may be light absorptive particles, such as carbon black nanoparticles, and may be sized on the order of nanometers. For example, embedded particles 716 may range in size from 50 to 70 nm. The ratio of embedded particles 716 to base material 714 may vary depending on desired performance of the layer. For example, a single layer, such as an adhesive tape applied to the exterior of eyepiece stack 702 may have a weight per weight (w/w) of 5%. In some embodiments, higher or lower ratios of embedded particles 716 to base material 714 may also be used to optimize performance of edge material 706 across multiple layers. For example, second layer 708B may have a carbon nanoparticle w/w of 1%, and third layer 708C may have a carbon nanoparticle w/w of 3%.

Base material 714 of second layer 708B may be the same material as first layer 708A such that the index of refraction of second layer 708B is similar to, or substantially the same as, the index of refraction of layer 708A. The similarity between the two refraction indices facilitates light 710 entering second layer 708B from first layer 708A with minimal refraction or reflection.

The composition of embedded particles 716 disposed within base material 714 in second layer 708B allows a portion of light 710 to be absorbed by second layer 708B. For example, light 710 traveling into second layer 708B may encounter one or more embedded particles 716 where it is absorbed. Light 710 that does not encounter an embedded particle 716 may continue to travel through base material 714 of second layer 708B toward third layer 708C.

Third layer 708C may be a doped material having embedded particles 716 disposed within a base material 714. The base material 714 of third layer 708C may be selected to have the same or similar index of refraction as the base material of second layer 708B. Having a same or similar index of refraction between the layers facilitates light 710 crossing through the interface between second and third layers 708B, 708C, respectively. In some embodiments, the base material 714 of third layer 708C may be the same material as the base material of second layer 708B, such as an epoxy material. In the embodiment shown in FIG. 7, third layer 708C further includes embedded particles 716. The ratio of embedded particles to base material may be substantially the same as another layer, or alternatively, may have a different ratio. In the example shown, third layer 708C may have a higher ratio of embedded particles to base material as compared with second layer 708B. Similar to second layer 708B, light entering third layer 708C may encounter embedded particles 716 which absorb the light. Light 710 that does not encounter an embedded particle continues through base material 714 toward fourth layer 708D. It is possible that at least a portion of light 710 that transmits through second layer 708B will reflect or scatter upon the interface between second layer 708B and third layer 708C. Embedded particles 716 in second layer 708B may then further absorb such reflected or scattered light.

Fourth layer 708D may be a doped material similar to third layer 708C having a base material 714 with embedded particles 716. The base material of fourth layer 708D may be selected to have an index of refraction similar to the base material of third layer 708C to facilitate light entering fourth layer 708D from third layer 708C. In certain embodiments, base material of fourth layer 708D may be the same as base material of third layer 708C, such as an epoxy material.

Embedded particles 716 may be light absorptive particles, and may be made of a carbon black material. The ratio of embedded particles to base material may be substantially the same as another layer, or may have a different ratio. As shown in FIG. 7, fourth layer 708D may have a higher ratio of embedded particles to base material as compared with second layer 708B or third layer 708C. Light entering fourth layer 708D may encounter and be absorbed by embedded particles 716. Light that does not encounter an embedded particle may continue to travel through base material 714. It is possible that at least a portion of light 710 that transmits through third layer 708C will reflect or scatter upon the interface between third layer 708C and fourth layer 708D; embedded particles 716 in third layer 708C may then further absorb such reflected or scattered light.

After passing through all of the layers of edge material 706, very little light will remain unabsorbed. However, light 710 that does reach an outermost edge 718 of edge material 706 may be reflected back into fourth layer 708D. This light may continue to pass through the multiple layers 708D, 708C, 708B where it will have additional absorption events by the embedded particles 716 of the respective multiple layers.

One of skill in the art will appreciate that many variables may be altered within the scope of the present disclosure. For example, the number and composition of layers may be adjusted to provide more or less light absorption, reflection, and refraction. In addition, the thickness of each layer may be varied. As discussed above, the base material and embedded particles may be epoxy and carbon black particles, respectively; however, other glues, adhesives, and known sealing materials may be used as the base, and other types and sizes of particles may also be used in addition to or in place of the carbon black particles disclosed. These design changes may be used to optimize the edge material configuration to improve light absorption, cost, aesthetic appeal, ease of manufacture, weight, durability, or any other selected variable.

The edge material disclosed may be manufactured by dropping dots of each layer material around the edge of the eyepiece stack and curing one layer at a time to form as many layers as desired. With each layer, the material composition, in particular the embedded particle-to-base material ratio, may be changed to create the seal described above. Alternatively, edges of the eyepiece stack may be dipped into the layer material and cured, then dipped into material for the adjacent layer and cured, and so on until the desired layer build up is finished.

In yet another alternative embodiment, each layer may be pre-formed as an adhesive tape that may be wrapped around the edge of the eyepiece stack. For example, referring to the edge material shown in FIG. 7, four different tapes can be used. The first tape wrapped directly around outer edge 704 of eyepiece stack 702 would comprise first layer 708A. This tape may be made up of a uniform epoxy material. To form second layer 708B, a section of tape made up of epoxy and a selected concentration of carbon particles may be wrapped over first layer 708A. Third and fourth layers 708C and 708D would be sequentially wrapped around the previous layer to build up the final thickness of edge material 706. In some embodiments, the multiple layers of tape may be stacked prior to wrapping the tape around the eyepiece 700 so that fewer wrapping steps are performed.

In some embodiments, the grating structures to control wicking may control the gradient concentration of embedded particles 716. For example, in a wicking gradient pattern with a pitch, or space between gratings, pillars, or relief structures otherwise, or 400-600 nm near the outside edge of the eyepiece stack, but become gradually narrower to have a pitch of 100 nm approaching the functional area of the eyepiece. In such an embodiment, the adhesive doped with carbon material would wick into the larger pitch more easily than into the smaller pitch, thus introducing fewer carbon particles into the adhesive closer to the functional area as compared to the adhesive nearer the outside edge. The size of the carbon nanoparticles could further control the concentration of embedded particles in such embodiments; by having carbon nanoparticles greater than 100 nm, or carbon nanoparticles of varying dimensions doped into a common adhesive or epoxy, only certain sizes would wick into certain portions of the structures. In such embodiments, a common percentage w/w but a variable carbon particle size could produce a gradient in the carbon distribution across the layers.

Figure 8:
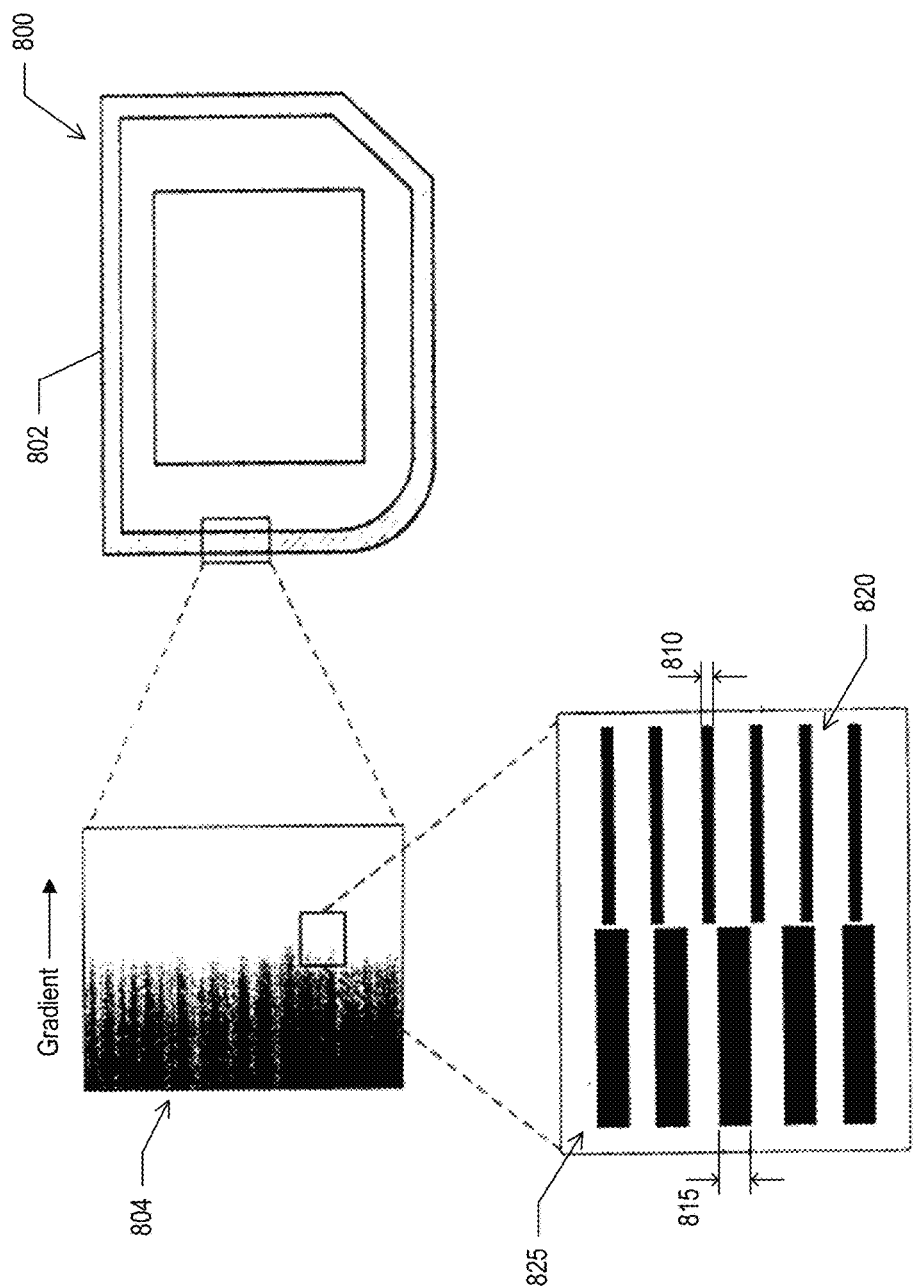
FIG. 8 depicts an example of a progressive gradient edge sealant by varying grating pitch, according to some embodiments of the present disclosure.

FIG. 8 illustrates an example of a gradient carbon blacking by such variable pitch. FIG. 8 depicts an example eyepiece 800, with an enlarged view 804 of an edge portion 802 of the eyepiece 800. As depicted in FIG. 8, grating structure 820 is closer to a functional area of an eyepiece relative to grating structure 825. Grating structure 825 has a wider pitch 815, as compared to narrower pitch 810 between grating structure 820. As a result, carbon doped adhesive or sealant entering the grating pattern will move more easily through pitch area 815 than pitch area 810, and given a carbon nanoparticle size embedded, more carbon particles will occupy pitch area 815 than pitch area 810 to provide a gradient absorption profile as a function of grating pattern. In such embodiments, even a constant density of carbon particles throughout the adhesive will yield a gradient absorption profile due to the varying amount of adhesive across the profile that may occupy the space between the gratings 815 or 825. In some embodiments, the sealant (e.g., edge material 108) may have a refractive index that is the same, or substantially the same, as the refractive index of the material of the eyepiece (e.g. the refractive index of the substrate of the various layers of the eyepiece structure). In some embodiments, the sealant may have a variable density through its cross section, such that the sealant is denser at the surface that is opposite to the direct interface and/or application to the eyepiece, and less dense nearer to its interface with the eyepiece.

Figure 9:
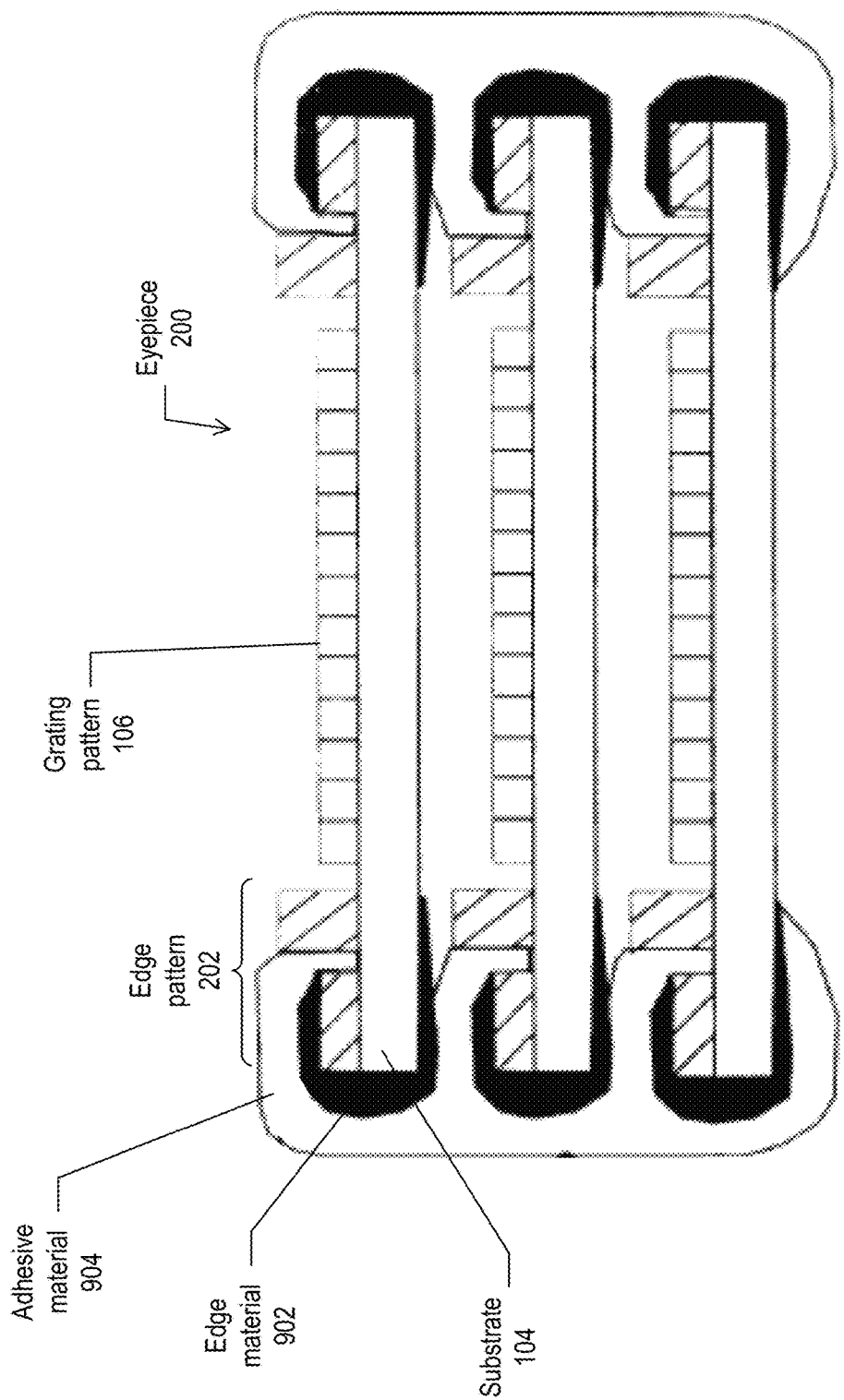
FIG. 9 depicts a cross-sectional view of an example eyepiece including a combination of light mitigation material and adhesive material, according to some embodiments of the present disclosure.

In some embodiments, and as depicted in FIG. 9, a combination of edge blackening and a separate adhesive is applied. In such an embodiment, a blackening layer may be first applied to wick into the edge patterns first, and then a second adhesive material applied to bind the layers together. Such a combination permits maximizing the reflection mitigation of the blackening material without potential tradeoffs to enhance adhesion, and similarly maximizes the properties of the adhesive. FIG. 9 depicts a cross-sectional view of an example eyepiece 200, including a combination of light mitigation material 902 and adhesive material 904, according to some embodiments of the present disclosure. As shown FIG. 9, in some embodiments an adhesive material 904 may be used to bind the layers of substrate 104 to one another in the eyepiece 200, and a separate, different edge material 902 may be used for light mitigation. As shown, the edge material 902 may be a blackening material applied to the edge region of the various layers, to absorb light that reaches the edges. In some embodiments, the adhesive material 904 has a same (or substantially similar) refractive index as that of the substrate 104.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

A number of embodiments have been described. Nevertheless, it will be understood that various modifications may be made without departing from the spirit and scope of the disclosure. For example, various structures shown above may be used, with elements rearranged, positioned differently, oriented differently, added, and/or removed. Accordingly, other embodiments are within the scope of the following claims.

What is claimed is:

1. An optical structure comprising:
    a substrate including:
        a first edge grating pattern that is on a first surface of the substrate and that is proximal to an edge of the substrate, the first edge grating pattern arranged to control capillary flow of a material from the edge of the substrate into the first edge grating pattern; and
        a second edge grating pattern that is on a second surface of the substrate, the second grating pattern including one or more of an orthogonal pupil expander (OPE) region and an exit pupil expander (EPE) region.

2. The optical structure of claim 1, wherein the first edge grating pattern includes one or more features that are arranged to be substantially perpendicular to the edge of the substrate.

3. The optical structure of claim 1, wherein the first edge grating pattern includes one or more of a V-shaped grating pattern, an S-shaped grating pattern, and a rectangular grating pattern.

4. The optical structure of claim 1, wherein the first edge grating pattern is further arranged to inhibit the capillary flow of the material beyond the first edge grating pattern.

5. The optical structure of claim 4, wherein the first edge grating pattern includes one or more features that are arranged to be substantially parallel to the edge of the substrate.

6. The optical structure of claim 1, wherein:
    the first edge grating pattern includes one or more first features that are arranged to be substantially perpendicular to the edge of the substrate;
    the first edge grating pattern includes one or more second features that are arranged to be substantially parallel to the edge of the substrate and to inhibit the capillary flow of the material beyond the first edge grating pattern; and
    the one or more second features differ, at least in part, from the one or more first features in at least one of depth, height, and width.

7. The optical structure of claim 1, wherein the material has a refractive index that is lower than that of the substrate.

8. The optical structure of claim 1, wherein the material, as applied, has a gradient of refractive index that varies according to a distance from the edge of the substrate.

9. The optical structure of claim 1, wherein the first edge grating pattern includes one or more features that have a cross-sectional shape of at least one polygon.

10. The optical structure of claim 9, wherein the at least one polygon includes one or more of a triangle, a square, and a rectangle.

11. The optical structure of claim 1, wherein:
    the substrate is a waveguide configured to receive and propagate light; and
    the material is a light variable absorptive edge material configured to receive and absorb light from the waveguide.

12. The optical structure of claim 1, wherein the material and the substrate have a substantially same index of refraction.

13. The optical structure of claim 1, wherein the material comprises a doping agent and an adhesive.

14. The optical structure of claim 13, wherein the doping agent is distributed at a gradient that varies with distance from an edge of the waveguide.

15. The optical structure of claim 13, wherein the doping agent comprises carbon black nanoparticles.

16. The optical structure of claim 15, wherein the carbon black nanoparticles have a diameter in a range of 50-70 nm.

17. The optical structure of claim 1, wherein the material comprises at least one of a doping agent and an adhesive that is included in at least one layer of adhesive tape.

18. The optical structure of claim 17, wherein the adhesive tape and the substrate have a substantially same index of refraction.

19. The optical structure of claim 1, wherein:
    the substrate is one of a plurality of layers of substrate included in the optical structure;
    each of the plurality of layers includes the first edge grating pattern proximal to a respective edge of the layer; and
    the material is an edge adhesive that is applied along at least a portion of a perimeter of the optical structure to secure the plurality of layers of substrate.

20. The optical structure of claim 19, wherein each of the plurality of layers of substrate further includes the second grating pattern.

21. The optical structure of claim 20, wherein the first edge grating pattern is arranged to provide for a capillary flow of the edge adhesive into the first edge grating pattern, and is further arranged to inhibit the capillary flow of the edge adhesive into the second grating pattern.

22. The optical structure of claim 20, wherein:
    the second grating pattern is of a nano-scale and operates as a waveguide for light propagation; and
    the first edge grating pattern is one or more of a micro-scale and a nano-scale.

* * * * *